United States Patent [19]

Clark

[11] 3,728,915
[45] Apr. 24, 1973

[54] TRANSMISSION SHIFT CONTROL
[75] Inventor: William B. Clark, Indianapolis, Ind.
[73] Assignee: General Motors Corporation, Detroit, Mich.
[22] Filed: Apr. 23, 1971
[21] Appl. No.: 136,881

Related U.S. Application Data

[62] Division of Ser. No. 869,732, Oct. 27, 1969, Pat. No. 3,602,344.

[52] U.S. Cl. ................................. 74/868, 74/732
[51] Int. Cl. .................... B60k 21/00, F16h 47/00
[58] Field of Search ..................... 74/865, 867, 868

[56] References Cited

UNITED STATES PATENTS

| | | | |
|---|---|---|---|
| 3,394,622 | 7/1968 | Chana | 74/867 |
| 3,425,299 | 2/1969 | Fisher | 74/868 X |
| 3,587,354 | 6/1971 | Oguma et al. | 74/868 |

*Primary Examiner*—Arthur T. McKeon
*Attorney*—W. E. Finken and A. M. Heiter

[57] ABSTRACT

A transmission having a converter drive and a direct drive clutch in which the manual neutral and drive control valve supplies fluid to engage the converter drive clutch and the governor actuated direct drive clutch valve supplies fluid through a restriction to engage the direct drive clutch and also to an accumulator pressure regulator to provide a gradual pressure rise in the direct drive clutch motor to a value that carries the load, and then actuates an overlap relay valve to exhaust the converter drive clutch motor for overlap independent of time. On a direct to converter shift, the downshifting direct drive valve connects the accumulator, overlap valve and the direct clutch motor through a restriction to exhaust to delay disengagement of the direct clutch and promptly shifts the relay valve to supply fluid to the converter clutch for a quick engagement for overlap. In the controls for a downshift from a higher ratio to a lower ratio, a throttle actuated valve provides an additional restriction in an exhaust line to delay a downshift at zero and low throttle as compared to the full and high throttle downshift to improve the character of the downshifts while providing fast upshifts at all throttle settings.

2 Claims, 1 Drawing Figure

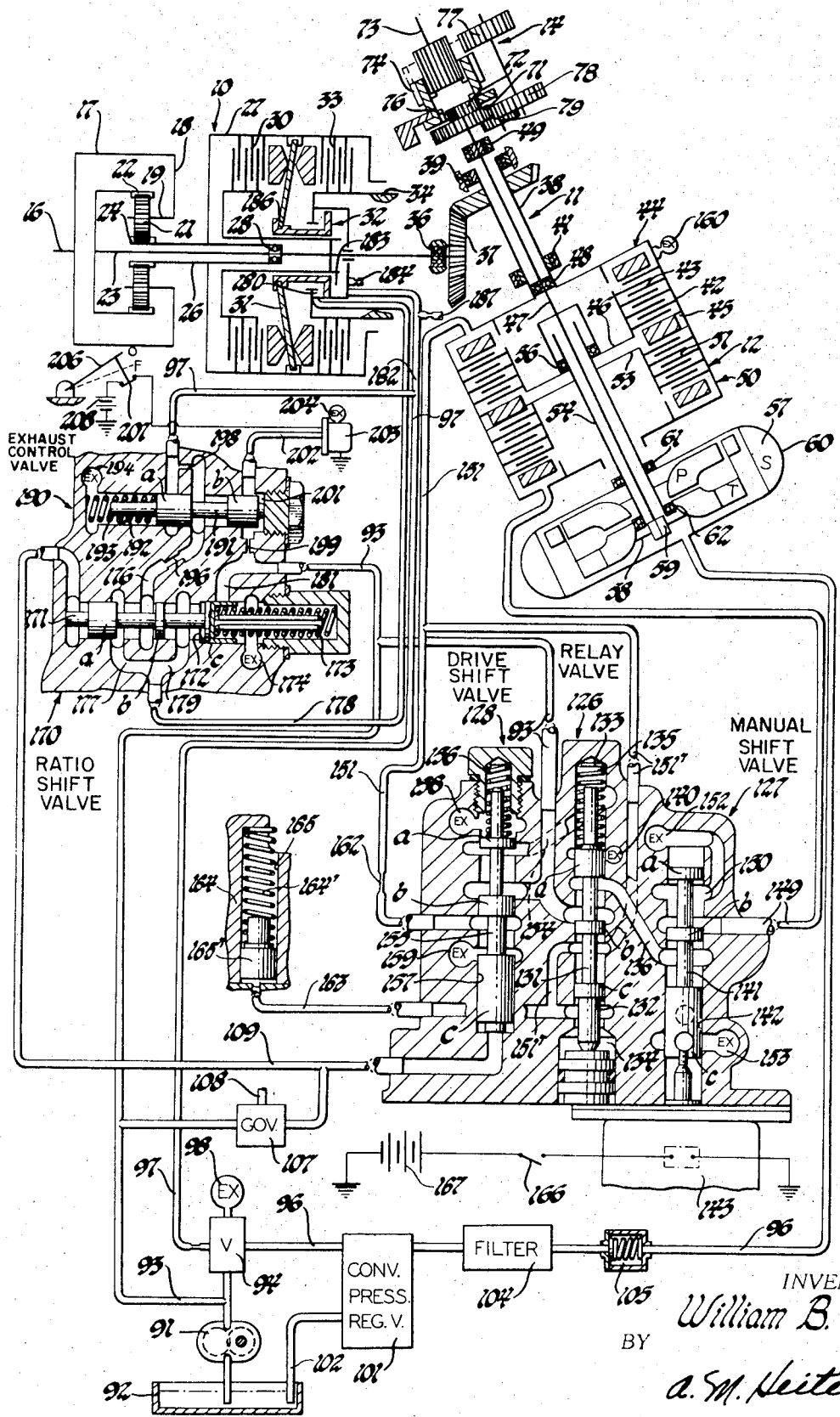

TRANSMISSION SHIFT CONTROL

This invention relates to a transmission and controls therefor and is a division of U.S. Ser. No. 869,732, now U.S. Pat. No. 3,602,344 filed Oct. 27, 1969.

The invention may be employed in transmissions of the type disclosed having a splitter gear unit providing a two speed input drive and direct drive and converter drive clutches to selectively drive the intermediate shaft connected by forward and reverse gearing to the output shaft. The selectively engaged converter clutch provides a torque converter drive and the direct drive clutch provides a direct drive. The control system has a neutral and drive valve which, in the neutral position, disengages the converter drive clutch and in the drive position supplies fluid to engage the converter drive clutch. At the speed of the vehicle where the converter torque multiplication ratio approaches 1:1 drive and before the efficiency reduces, the governor actuates the direct drive clutch valve to connect the main line through an orifice to the direct drive clutch motor and also to an accumulator pressure regulator which causes the pressure in the direct drive clutch motor to gradually rise. When this pressure rise has reached a value sufficient to engage the direct drive clutch to carry the maximum load, the next increment of pressure rise also actuates the relay overlap valve which moves to disengage the converter clutch. Thus, on a shift from converter to direct drive, the direct drive clutch is fully established or carrying the load and then the converter clutch is released. This insures overlap independent of engagement time for a smooth shift between converter and direct drive. In the two speed splitter unit, the spring applied lower ratio is engaged by exhausting a fluid motor to a low lubrication pressure. At zero or low throttle, an additional restriction delays exhaust and thus engagement of the lower ratio so that sufficient time is permitted between the disengagement of the higher ratio and the engagement of the lower ratio for the accommodation of the speed differential for a smooth shift. At higher throttle ratios, a faster downshift is desired and this throttle controlled valve bypasses the additional restriction. The upshift timing is not affected by this downshift control.

An object of the invention is to provide in a shift control system wherein fluid pressure is supplied to engage a higher drive and exhausted to engage a lower drive, an improved system having variable restriction to provide an increased restriction to flow during closed and low throttle downshifts without affecting the timing of upshifts.

Another object of the invention is to provide in a shift control system wherein a high pressure is supplied to a motor to engage a high ratio and exhausted to engage a lower ratio and on a downshift at part and full throttle positions the fluid motor is connected to exhaust to a lower lubrication pressure by a fast flow passage and at zero and low throttle by a slow flow passage without affecting upshift timing.

Another object of the invention is to provide in a shift control system wherein a high pressure is supplied to a motor to engage a high ratio and exhausted to engage a lower ratio and on a downshift at part and full throttle positions the fluid motor is connected to exhaust to a lower lubrication pressure by a fast flow passage and at zero and low throttle by a slow flow passage without affecting upshift timing provided by a bypass valve located downstream of the shift valve and controlled by a solenoid valve which is unenergized and spring closed in part and full throttle positions to confine an actuating pressure to position the bypass valve in bypass position and which is energized at low and zero throttle positions to exhaust the actuating pressure to position the bypass valve in blocking position so the exhaust must flow through the slow flow passage.

These and other objects of the invention will be more apparent from the following drawing and description of the preferred embodiment.

The drawing schematically shows the transmission gearing and control system.

This transmission drive train has a two-speed splitter input unit 10, a bevel drive unit 11, a converter drive clutch, direct drive clutch and torque converter assembly 12 and a forward and reverse output drive 14. The input shaft 16, or engine shaft, drives a flywheel 17 which is drivingly connected through the drive plate 18 to drive the carrier 19 which has planetary pinions 21 meshing with the ring gear 22 drivingly connected to the intermediate or splitter output shaft 23 and a sun gear 24 connected to the sun gear sleeve shaft 26. A clutch drum 27 is secured at a middle point to the sleeve 26 so that the center of the drum is substantially concentric with the sleeve shaft bearing 28. The splitter low or direct drive clutch 30, when engaged by the Belleville lever spring 31, when the fluid motor 32 is released, connects the sun gear and the ring gear to lock up the gear unit for direct drive or low. The brake 33, when engaged by motor 32 acting through lever spring 31, connects the sun gear 24 to the grounded housing portion or cylinder 34 of motor 32 to retard the sun gear for high or overdrive.

The splitter output shaft 23, supported at the rear end by a bearing 36, is connected by the bevel gear unit 37 to drive the angle drive input shaft 38 mounted in bearings 39 and 41 supported on the housing and the converter and direct drive clutch drum 42. The drum 42 is connected by the clutch 43 when engaged by the motor 44 to drive the direct drive hub 46, which drives the intermediate shaft 47, which is supported by a bearing 48 between the sleeve shaft 38 and a rear bearing 49 on the housing. The drum 42 also drives through the converter clutch 51, actuated by motor 50, the converter clutch hub 53 which is splined to the converter input shaft 54 which drives the pump P of the torque converter. The clutches have a common backing plate 45 fixed to drum 42. A bearing 56 between the hubs 46 and 53 supports the end of shaft 54 and locates the direct drive clutch hub. The clutches 43 and 51 have conventional retraction springs, not shown.

The torque converter pump P drives fluid in a toroidal path in the operating chamber 57 to drive the turbine T which is connected through a hub 58 and a one-way clutch and bearing unit 59 to drive the intermediate shaft 47 in one direction and to support the intermediate shaft. The stator blades S are secured to the fixed housing 60 and provide reaction in the torque converter. The forward or pump end of the pump shaft 54 is supported to the fixed housing 60 by a bearing 61. The bearing 62 supports the turbine assembly on the shaft 54.

The shaft 47 drives the output gear 71 and clutch teeth 72. The output shaft 73 has an external spline fitting the internal spline of a gear 74 to permit axial movement and provide rotary drive. When the clutch teeth 76 on gear 74 engage the clutch teeth 72 on gear 71, direct drive is provided. When the gear 74 is moved axially and engages the gear 77 driven from the reversing idling gears 78-79, reverse drive is provided.

HYDRAULIC SYSTEM

The input driven pump 91 draws fluid from a sump 92 located in the base of the transmission housing and supplies fluid to the main line 93 at a pressure regulated by the main line regulator valve 94 which exhausts the normal overage to the converter feed line 96 and the lubrication line 97 and has an exhaust 98. The pressure in the converter feed line is regulated by the converter pressure regulator valve 101 which exhausts the overage via exhaust line 102 to sump. The converter feed line 96 is connected through a filter 104, a check valve 105 for a one-way feed to the converter operating chamber in housing 60. A governor 107 supplied with fluid from the main line 93 is driven through shaft 108 at a speed proportional to the speed of the output shaft 73 and provides in governor line 109 a governor pressure proportional to vehicle speed or output shaft speed.

The direct drive and converter drive clutches are controlled by a relay converter control valve 126, a manual converter control valve 127 and an automatic direct clutch shift valve 128. The relay valve 126 has a valve element 131 having lands $a$, $b$ and $c$ of equal diameter located in a bore 132 and biased to the open position by spring 133 when downshift actuator fluid is supplied to closed spring chamber 135 and direct clutch apply pressure to chamber 134 and closed when fluid is supplied only to the chamber 134. This valve in the open or converter drive position shown, connects the main line 93 to the transfer passage 136 leading to the manual shift valve 127 and in the closed position blocks this connection and connects transfer passage 136 to exhaust 140. The manual shift valve has a valve element 141 having lands $a$, $b$, and $c$ of equal diameter located in the bore 142, and is actuated by a solenoid 143, which in the current on or drive position connects transfer passage 136 between lands $b$ and $c$ to the converter clutch apply line 149, which supplies fluid to the converter drive motor 50 to engage the converter clutch 51. In the solenoid off or neutral position shown, passage 136 is blocked and the converter clutch apply line 149 is connected between the lands $a$ and $b$ to the exhaust 150 of the direct drive apply line 151. The ends of the bore 142 are vented by exhausts 152 and 153.

The shift valve 128 has a valve element 155 having lands $a$, $b$ and $c$ located in a bore 157 and is biased to the closed or downshift position for converter drive as shown by the spring 156. The spring chamber end of the bore is vented by exhaust 158 to prevent fluid accumulating and interfering with the action of the valve. With the shift valve in the downshift position, main line 93 is connected between lands $a$ and $b$ of shift valve 155 to relay line 154 which pressurizes the unvented spring chamber end of bore 132 to hold valve 128 in open position and the direct drive clutch valve line 151 is connected between lands $b$ and $c$ to exhaust 159 disengaging the direct drive clutch since the manual valve is in the drive position and the relay valve 126 is in the opened position, the transmission is in converter drive.

The governor pressure in the governor branch line 161 is connected to the other end of bore 157 and acts on the end of land $c$ of valve element 155. When governor pressure, which increases with increasing speed, increases sufficiently to overcome the biasing force of the spring 156, the valve moves to the upshift position connecting main line 93 to direct drive clutch apply line 151 and blocking exhaust 159. The fluid supplied to the direct clutch apply line 151 and motor 44 flows through the restriction 162 and downstream of the restriction enters branch 151' and is connected through chamber 134 to line 163 which is connected to the accumulator 164. The pressure in line 163, 151' and 151 downstream of restriction 162 rises slowly due to the restricted feed, the increasing volume and increasing spring rate of the accumulator 164 when it reaches the pressure at which the direct drive clutch 43 is substantially engaged to carry the load, the pressure in chamber 134 downshifts valve 126. The pressure in chamber 134 on this downshift only acts against spring 133 since chamber 135 is connected by relay line 154 and upshifted shift valve 155 to exhaust 158. The downshifted relay valve 131 cuts off the supply of main line fluid from line 93 to transfer passage 136 and the converter apply line 149 and connects the converter apply line 149 via transfer line 136 to exhaust 140. The accumulator 164 has a high rate spring 164' in the vented end of bore 165 which biases the piston 165' to the closed end of the bore which is connected to line 163. Thus, on a shift to direct drive the pressure increases quickly to a low value sufficient to overcome the retraction springs and then gradually increases over an extended time period as the piston strokes.

When the pressure increases sufficiently so the direct clutch carries the load, a further small increment of pressure increase acting in chamber 134 downshifts the relay valve connecting converter clutch line 149 via transfer line 136 to exhaust 140 to then quickly disengage the converter drive for a full overlap shift. The preferred input converter clutch to input direct clutch shift is made at a speed value before the fixed housing converter efficiency reduces as the converter approaches 1:1 drive so there is little speed and torque change for a smooth shift. Then the main line 93 is directly connected between lands $b$ and $c$ of relay valve 131 via branch 151' to line 151 and motor 44 to bypass restriction 162 to insure continued full engagement and to condition the system for a downshift.

When the vehicle speed is reduced to a speed lower than the upshift speed, as determined by the conventional hysteresis provided by differential areas of lands $b$ and $c$ of valve element 155, the valve element 155 downshifts. In the downshifted position, main line 93 is connected between lands $a$ and $b$ to relay line 154 and balances the pressure in chamber 134 at the other end of the relay valve so the spring 133 opens relay valve 126 to connected main line 93 to transfer line 136, converter clutch line 149 and motor 50 for converter drive. At the same time direct drive clutch line 151 is connected between lands $b$ and $c$ to exhaust 159. Since the volume of fluid from the direct clutch motor 44 and the accumulator 164 must flow through restriction 162 and a restricted exhaust 160 smaller than restriction 162 in the rotary cylinder of the rotary motor 44, there is a sufficient time delay before the direct drive clutch is unloaded to permit the converter clutch to pick up the load before it is dropped by the direct drive clutch. This time delay is provided and timed by the accumulator capacity above the high load carrying pressure which occurs during the gradual pressure rise provided by the accumulator. The restricted exhaust prevents centrifugally induced pressure in the rotary cylinder holding the direct drive clutch in a partially engaged position and insures a proper timed full disengagement. The rotary cylinder of the converter clutch may have a similar restricted exhaust for the same purpose.

For drive, the switch 166 is closed to connect the battery 167 to energize the solenoid 143 to place the valve 127 in the on position so the converter apply line 149 will be connected to transfer line 136 to engage the converter clutch. For neutral, switch 166 is disconnected, valve 127 is in the on position blocking transfer line 136 and connecting converter clutch line 149 to exhaust 150 to prevent converter drive. When in neutral, the shift valve 128 will upshift to provide engine braking at speeds at which direct drive is engaged.

A splitter shift valve 170 controls the supply of main line fluid and lubricating fluid to the double acting motor 32 to control the operation of the splitter low and splitter high motors. This valve has a valve element 171 having lands $a$ and $b$ of small diameter and a larger land $c$ located in a stepped bore 172 and is biased toward the downshift position by spring 173 in a chamber vented by exhaust 174. In the downshift position, the valve 170 connects the lubrication transfer line 176 to the branch 177 of overdrive apply line 178 connected to overdrive apply chamber 180 of motor 32 and blocks branch 179 of overdrive apply line 178 between lands $b$ and $c$ and branch 181 of main line 93 at land $c$. The lubrication line 97 is connected by branch 182 to the release chamber 183 which has a restricted exhaust 184 to lubrication to continuously vent the release chamber 183 and thus maintain a lower pressure acting on the larger area of the release side of the piston to provide a biasing force to almost balance the higher lubricating pressure in apply chamber 180 acting on the smaller area of the apply side of the piston, and provide a small residual force to the right in the drawing or the apply direction which keeps the transfer bearing 186 engaged. When the speed increases sufficiently to provide a governor pressure to upshift the shift valve, the valve will, in the upshift position, connect main line 93 via branch 181 to the branch 179 of apply line 178 to move the motor 32 to engage the overdrive clutch. The lubrication branch line 182 has restricted branch or branches 187 to lubricate the gearing.

The downshift valve 190 has a valve element 191 having lands $a$ and $b$ in bore 192 and is biased to the zero throttle position by spring 193 located in the spring chamber end of the bore vented by exhaust 194. In this position, lubrication transfer passage 176 which has a large opening restriction 196 therein, is connected between lands $a$ and $b$ of valve element 191 to the small opening restricted passage 198 to lubrication line 97 so flow from lubrication line 97 to overdrive apply line 178 is more restricted at zero throttle.

The main line 93 is also connected by restriction 199 to the end 201 of bore 192 to act on the end of land $b$ to move the valve element against the spring 193 to directly connect lubrication transfer line 176 to lubrication line 97, thus bypassing restricted passage 198 to provide faster flow at part and full throttle positions. The end chamber 201 of the bore 192 is also connected by passage 202 to a solenoid valve 203 which normally, when not energized, is spring loaded to block passage to exhaust 204. When the accelerator pedal 206 is in the zero throttle, or close to zero throttle positions, the switch 207 is closed and battery 208 energizes solenoid valve 203 to connect line 202 to exhaust 204 to vent chamber 201 so spring 193 will position valve element 191 so land $a$ blocks free flow through the valve and requires all flow to be through small restriction 198. Thus, on a low or zero throttle downshift overdrive apply line 178 is restricted by restrictions 196 and 198 so a slow smooth shift is made. This gives the engine time to decelerate before the shift is completed. Upshifts will only occur at higher throttle positions. Downshifts at higher throttle positions are not delayed and are smooth.

It will be understood that references to the direction of movement of valves on the drawing is for convenience of explaining the illustrated preferred embodiment of the invention which may be used in modified forms It is claimed:

1. In a transmission; drive means having a low speed friction means for establishing a low speed drive and high speed friction means for establishing a high speed drive and including fluid motor means normally establishing said low drive and operative on the supply thereto of fluid to disestablish low drive and establish high drive and on the exhaust of fluid to disestablish high drive and establish low drive; source means providing a source of fluid at a regulated pressure; an exhaust passage; shift valve means connected to said source means, said exhaust passage and said fluid motor and including means to move the shift valve means between an upshift position and a downshift position and being operative in an upshift position for connecting said source to said fluid motor to establish said high drive and in a downshift position for connecting said fluid motor to said exhaust passage; exhaust control valve means connected to said exhaust passage having a first position providing restricted flow from said exhaust passage and a second position providing freer fluid flow from said exhaust passage to exhaust and torque demand means operatively connected to said exhaust control valve means positioning said exhaust control valve means in said first position from zero to low torque demand values and in said second position at higher to full torque demand values.

2. In a transmission; drive means having a low speed friction means for establishing a low speed drive and high speed friction means for establishing a high speed drive and including a belleville lever spring normally biased for establishing said low drive and fluid motor means connected to said lever spring and operative on the supply thereto of fluid to move said spring against its bias to disestablish low drive and with continued movement in the same direction to establish high drive and on the exhaust of fluid to disestablish high drive and establish low drive; source means providing a source of fluid at a regulated pressure; an exhaust passage; shift valve means connected to said source means, said exhaust passage and said fluid motor and including means to move the shift valve means between an upshifted position and downshifted position and being operative in an upshift position for connecting said source to said fluid motor to disestablish said low drive and establish said high drive and in a downshift position for connecting said fluid motor to said exhaust passage to sequentially disestablish high drive and establish low drive; exhaust control valve means connected to said exhaust passage having a first position providing restricted flow from said exhaust passage and a second position providing freer fluid flow from said exhaust passage to exhaust and torque demand means operatively connected to said exhaust control valve means positioning said exhaust control valve means in said first position from zero to low torque demand values to provide more underlap on the downshift and in said second position at higher to full torque demand values to provide less underlap on the downshift.

* * * * *